J. J. KERMODE.
APPARATUS FOR BURNING LIQUID FUEL.
APPLICATION FILED AUG. 8, 1912.
1,193,701.
Patented Aug. 8, 1916.
6 SHEETS—SHEET 5.
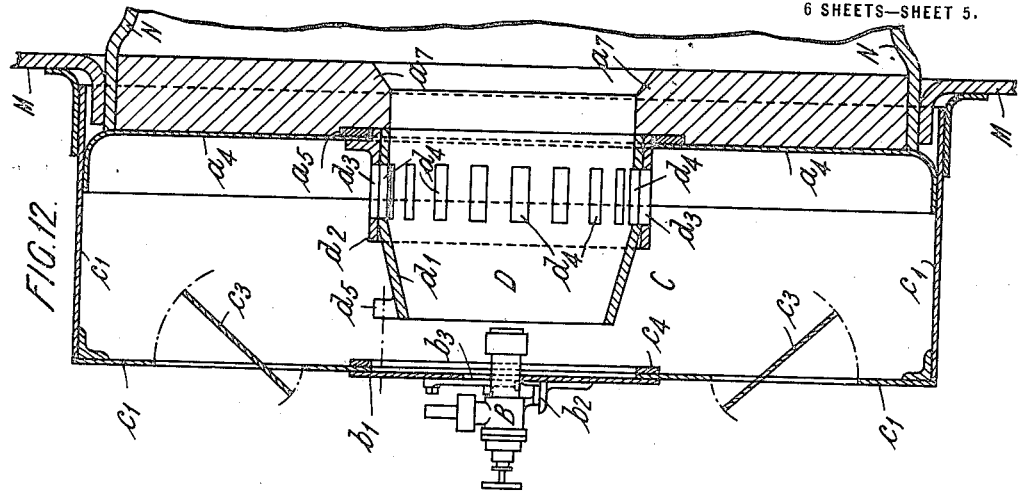
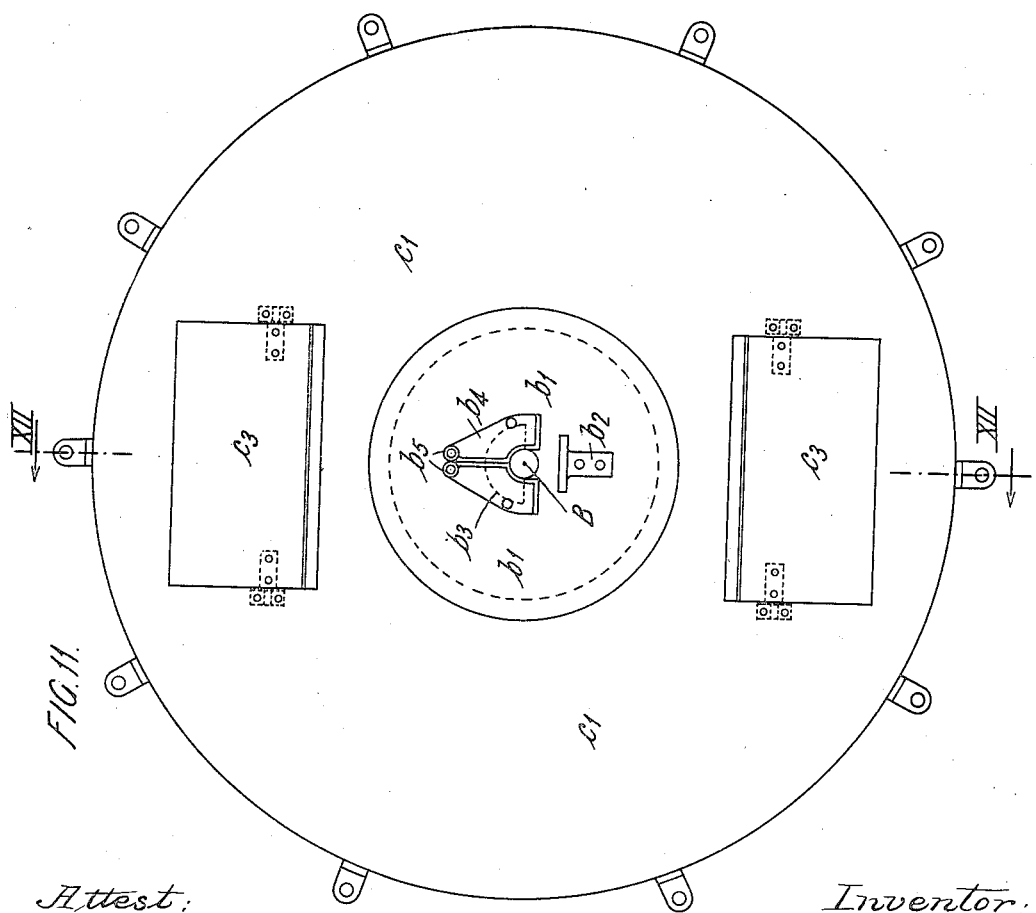
Attest:
Ewd L Tolson
C. E. Parsons
Inventor:
John J. Kermode
by Spear, Middleton, Donaldson & Spear
Attys.

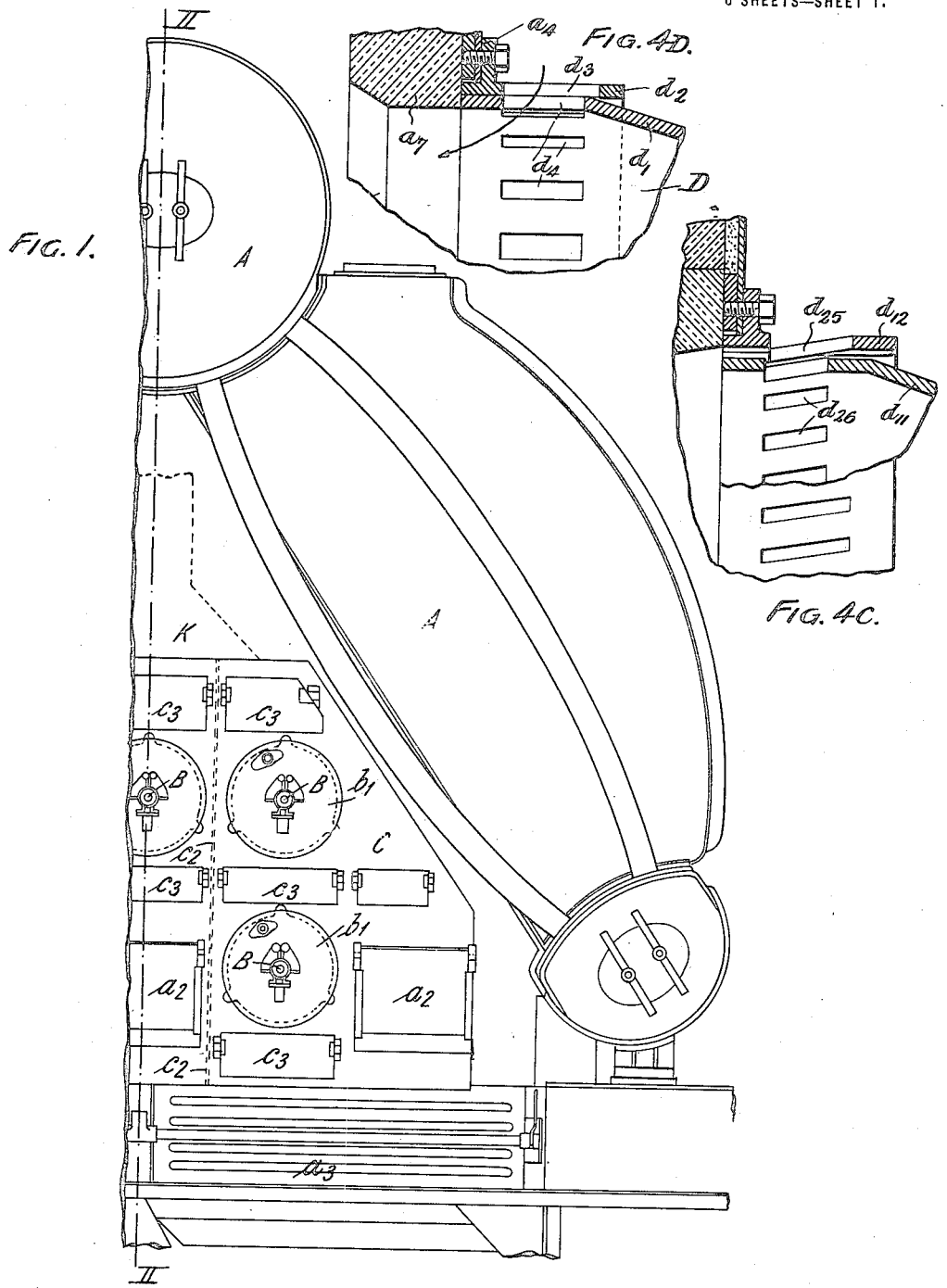

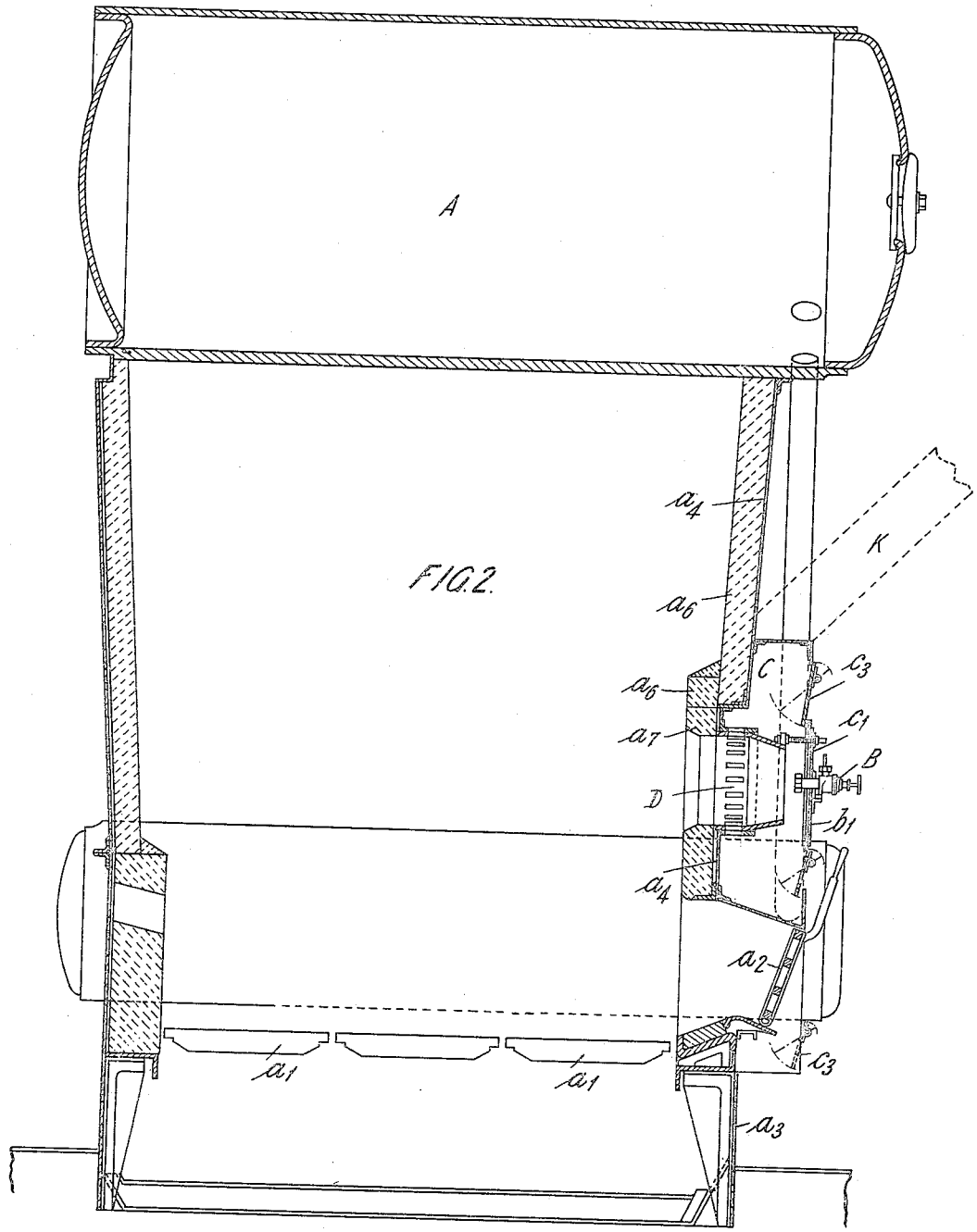

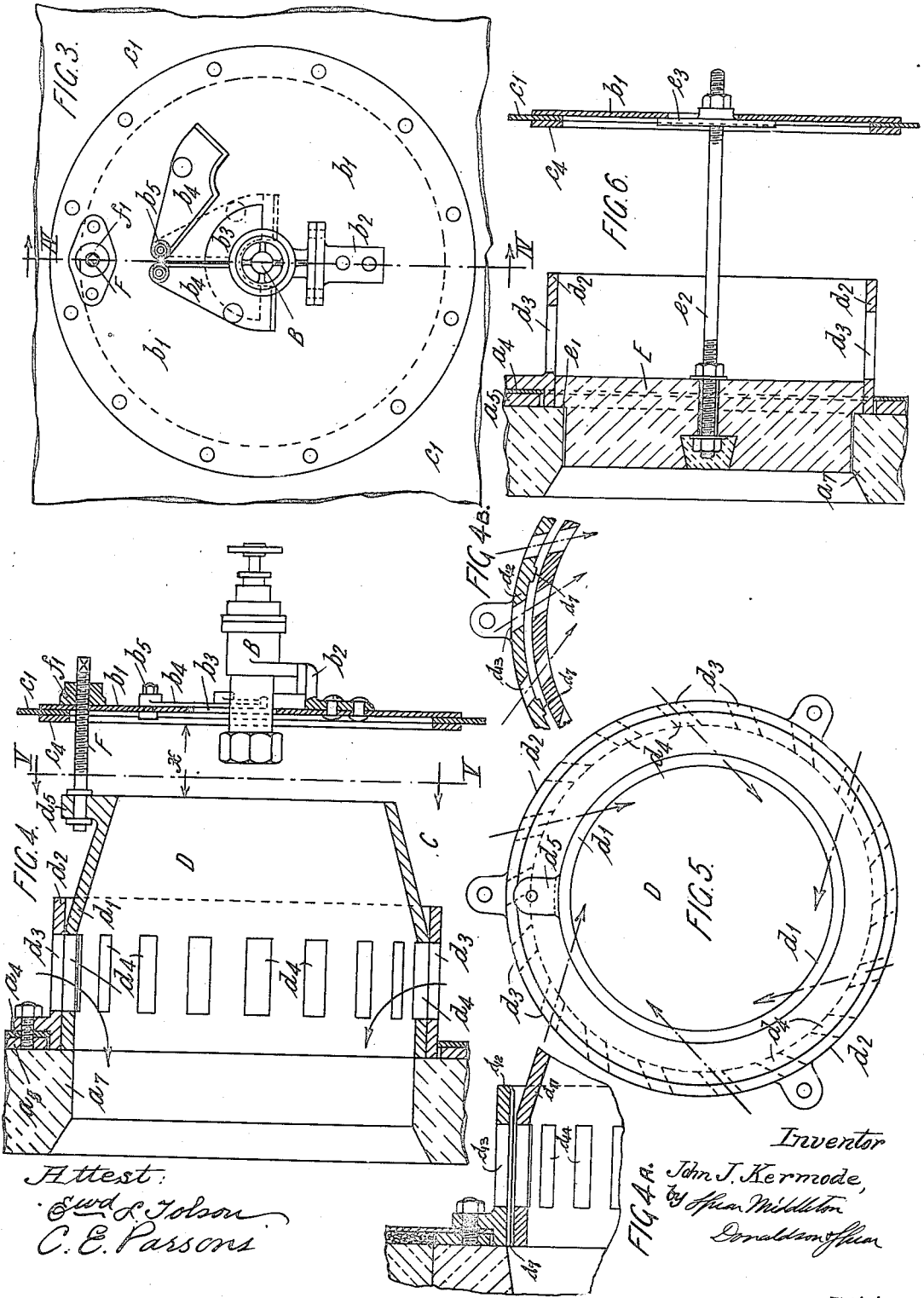

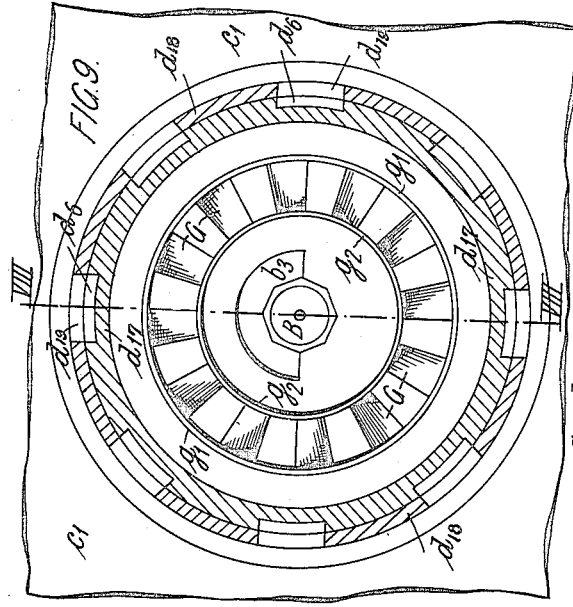
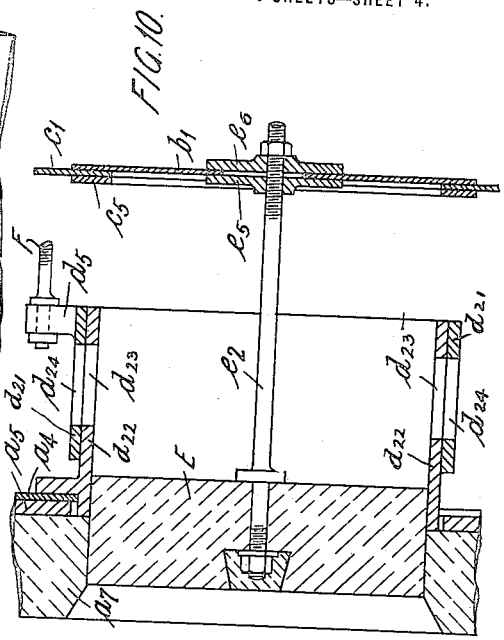
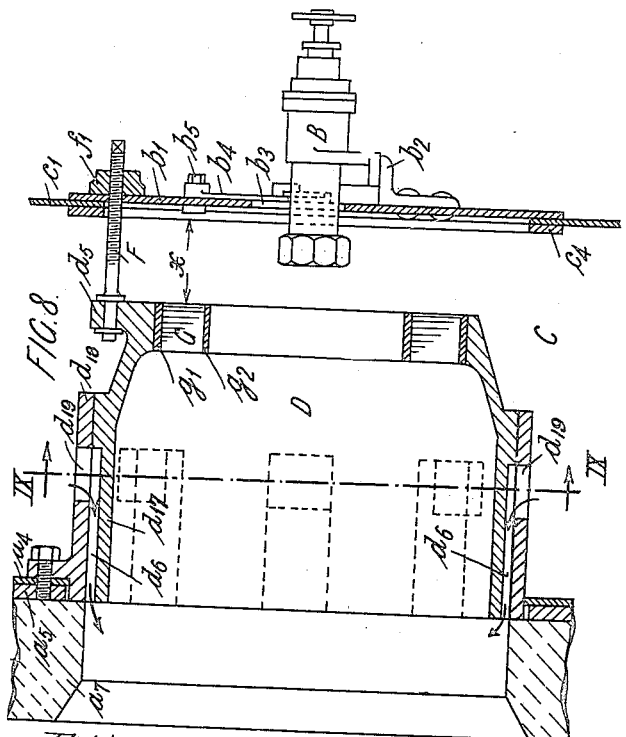
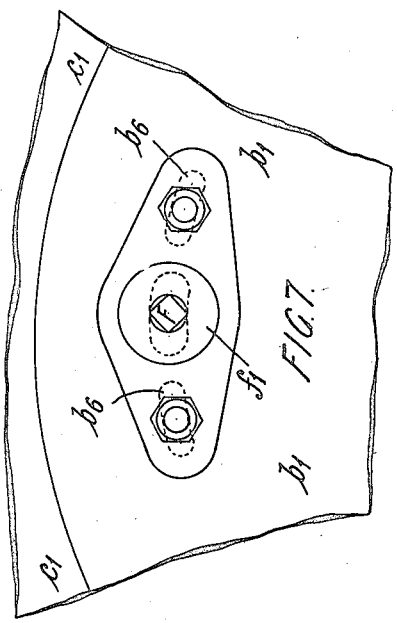

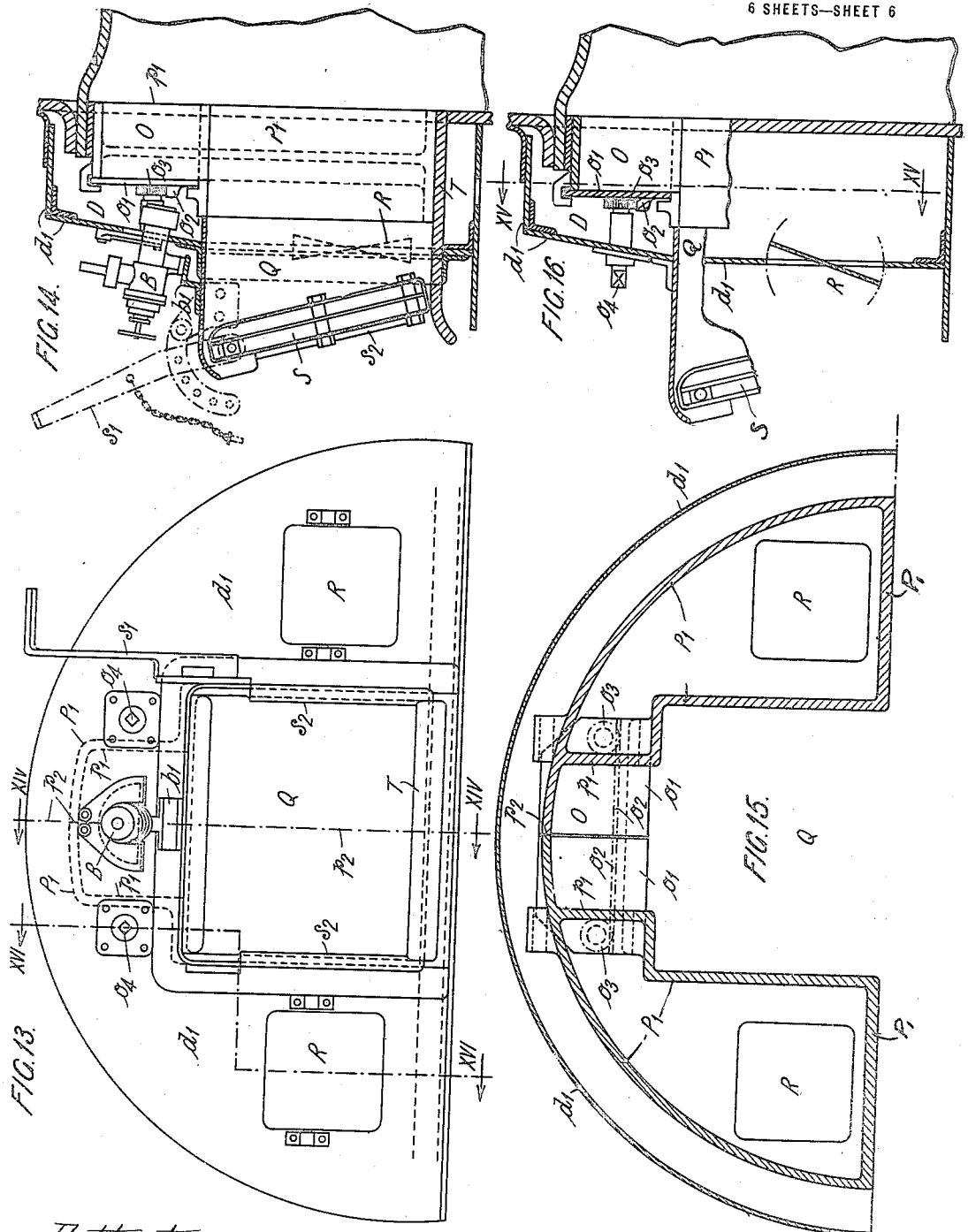

UNITED STATES PATENT OFFICE.

JOHN JONATHAN KERMODE, OF LIVERPOOL, ENGLAND.

APPARATUS FOR BURNING LIQUID FUEL.

1,193,701.
Specification of Letters Patent.
Patented Aug. 8, 1916.

Application filed August 8, 1912. Serial No. 714,119.

*To all whom it may concern:*

Be it known that I, JOHN JONATHAN KERMODE, a subject of the King of Great Britain, and residing in Liverpool, England, have invented certain new and useful Improvements in Apparatus for Burning Liquid Fuel, of which the following is a specification.

This invention relates to apparatus for burning liquid fuel, and is particularly applicable to marine boilers, and especially to such boilers which are adapted to burn both coal and liquid fuel, and the objects of the invention are;—to prevent any steam which may gain access to the furnace, say in consequence of a burst boiler tube, from entering the stoke-hold and injuring the stokers; to enable the renewal of the jet casings to be effected from the stoke-hold while the boiler is under steam; to enable the openings from any of the jet casings into the furnace to be closed by a tamp, introduced from the stoke-hold while the boilers are under steam, so as to protect the said casing when its oil jet is inoperative; to enable the adjustable part of the jet casing, which is the part liable to be burnt away, to be renewed from the stoke-hold while the boiler is under steam; and generally, to so construct and arrange the several parts and the regulating means as to provide for the proper admixture of the oil and the main and auxiliary air supplies in accordance with the power required, the air pressure available, and the quantity of the oil used.

The invention is illustrated in the accompanying drawings, in which,

Figures 1 and 2 show the general arrangement in the case of a water tube boiler adapted to burn both coal and liquid fuel, Fig. 1 being a front elevation of the right hand half of the boiler and Fig. 2 a side elevation in section on the line II, II, of Fig. 1. Figs. 3, 4 and 5 are views to a larger scale showing a jet casing, burner, burner plate and regulating means; Fig. 3 being a front elevation, Fig. 4 a side elevation in section on the line IV, IV, of Fig. 3, and Fig. 5 a transverse section on the line V, V, of Fig. 4. Figs. $4^a$ and $4^b$ are, respectively, a fragmentary longitudinal and transverse section of a modification of the arrangement shown in Figs. 4 and 5, Fig. $4^c$ which is a view similar to Fig. $4^a$, showing a further modification. Fig. $4^D$ is a fragmentary view of the upper portion of Fig. 4 showing a modification in the fixed ports. Fig. 6 shows the mode in which the jet casing is stopped by a tamp. Fig. 7 is a detail showing the arrangement for circumferentially adjusting the inner jet casing. Figs. 8 and 9 are views similar to Figs. 4 and 5, and show a modified form of jet casing, Fig. 8 being a side elevation in section on the line VIII, VIII, of Fig. 9, and Fig. 9 being a transverse section on the line IX, IX, of Fig. 8. Fig. 10 is a view, similar to Fig. 8, showing a further modification of the jet casing, and showing the tamp in position. Figs. 11 and 12 show the arrangement as applied to one of the cylindrical furnaces of a cylindrical boiler, Fig. 11 being an elevation, and Fig. 12 a side elevation in medial section. Figs. 13, 14, 15 and 16 show a modification where a burner is fitted to give an auxiliary oil supply to a furnace adapted to burn oil and coal alternatively, Fig. 13 being an end elevation, Fig. 14 a side elevation in section on the line XIV, XIV, of Fig. 13, Fig. 15 an elevation in section on the line XV, XV, of Fig. 16, and Fig. 16 an elevation in section on the line XVI, XVI, of Fig. 13.

Referring in the first instance to Figs. 1 and 2, A is the boiler which may be of any suitable type; in the drawings a water-tube boiler is shown adapted to burn coal on the bars $a^1$, and fitted with the usual furnace doors $a^2$ and ash-pit $a^3$ and adapted for forced-draft. The boiler is further fitted with five burners, B, for liquid fuel and the arrangement is such that either coal or liquid fuel may be used alternatively or so that both may be used together.

The arrangement for the liquid fuel is as follows;—A main air casing C is formed on the stoke-hold side of the boiler front $a^4$, by means of the plating $c^1$ which is carried around the furnace doors $a^2$ when the boiler is to be used for coal; in addition to the front, top, bottom and side plating $c^1$, transverse dividing plates such as $c^2$ may be fitted so as to divide-off individual burners or groups of burners. Air is admitted, from the stoke-hold where it is under pressure to the air casing through non-return louvers $c^3$, which are fitted so as to give each burner, or group of burners the necessary supply.

The burners B are carried on detachable burner-plates $b^1$ fitting over and closing corresponding openings in the front of the air casing. In the space in the air casing between the burner nozzle and the opening into the furnace, jet casings D are fitted, and the jet of atomized oil from the burner nozzle is projected through the jet casing into the boiler furnace, and one part $d^1$ of the jet casing is made movable relatively to the other part $d^2$ for the purpose of regulating the air supply to the jet from the air casing. The openings closed by the burner-plates $b^1$ are made sufficiently large to permit the movable part $d^1$ of the jet casing to be removed therethrough for renewal and replacement, and the said opening is therefore sufficiently large to permit the introduction of a tamp E (see Fig. 6) when from any cause it becomes necessary to close the opening from the jet casing into the furnace.

The jet casing may extend up to the front of the air casing, but preferably it stops short of the latter so that a main supply of air may pass into the jet casing through the space between the end of the latter and the air casing front, said supply being regulated by the axial movement of the part $d^1$. Air is also led into the jet casing through a series of ports $d^3$, $d^4$ formed at the furnace end of the jet-casing; one series of ports $d^3$ are formed in the fixed part $d^2$ and one series $d^4$ in the movable part $d^1$ and the available inlet area can be regulated by the movement of $d^1$ relatively to $d^2$.

It will be seen that should a tube burst and steam gain access to the furnace, such steam with the hot gases and fuel carried by it cannot blow straight through the louvers into the stoke-hold since it has first to pass through the jet casings and is deflected laterally by the burner-plates after which it impinges on the non-return louvers which are so pivoted, that they are at once closed and held closed until the pressure is relieved.

Referring now to Figs. 3, 4 and 5:—The burners B are carried from the burner plates $b^1$ by the brackets $b^2$, and the burner-plates are secured to the air casing plates $c^1$ by being bolted through the strengthening rings $c^4$. Semi-circular inspection openings $b^3$ are provided around the burner bodies for the purpose of inspecting the fuel jet; these openings are covered-in by the doors $b^4$ pivoted at $b^5$ one of which is shown partly open in Fig. 3. The fixed part $d^2$ of the jet casing is attached to the furnace front plates $a^4$, and strengthening rings $a^5$ are used to stiffen the joint. The inside of the front plate of the furnace is shielded by refractory material $a^6$ and this is carried as at $a^7$, around the joint between the jet casing and the furnace front, and overlaps the end of the inner part $d^1$ of the jet casing. The part $d^1$ is made a very free fit in the part $d^2$, and it is adapted to be moved both axially and angularly; the arrangement for giving the axial movement comprises a threaded stud F pivoted in a lug $d^5$ on $d^1$ and passing through a bracket $f^1$ carried on the burner plate $b^1$ which bracket forms a nut for F; on rotating F the inner part $d^1$ of the casing is moved in or out axially. The bolts by which $f^1$ is attached to the burner plate pass through slotted holes $b^6$ (see Fig. 7) in the latter plate so that the bracket and with it the threaded stud F and the inner casing can be rotated about the center line of the jet casing. Axial movement of $d^1$ varies the distance $x$ and regulates the main air opening to the jet casing. This movement may also vary the effective opening of the ports $d^3$ and $d^4$, but by making one set, say $d^3$ longer than $d^4$ as shown in Fig. $4^d$ the effective area may be made independent of the said axial movement. Angular movement of the casing does however control the area through the ports and they may be completely closed by said angular movement. The ports are preferably arranged obliquely as shown in Fig. 5, the center lines, shown by the dotted arrows, being tangents to a common circle; the effect of the oblique jets is to prevent the undue spreading of the jet of atomized oil and air. In some cases the ports $d^{25}$ and $d^{26}$ may be arranged as shown in Fig. $4^e$ obliquely to the direction of the jet in addition to being tangential as shown, and in this case the air entering by the ports assists in propelling the fuel jet.

The inner part $d^1$ of the jet casing requires renewal from time to time, and it will be seen if the burner be disconnected and the burner plate be removed, that this part $d^1$ may be withdrawn through the burner plate opening into the stoke-hold, and this may be done while the boiler is under steam.

Should it be required to close the jet openings into the boiler furnace, say when coal is being used or when it is desired to dispense with one or more of the burners, the inner part $d^1$ is removed as described, and a tamp E of fire clay or other refractory material is introduced as shown in Fig. 6; the tamp is preferably formed with a shoulder $e^1$ which abuts against the overlapping edge of $a^7$; the tamp is provided with a central stud $e^2$ provided with screw threaded plate $e^3$ which abuts against the inside of the burner plate $b^1$ and holds the tamp in position and closes the burner opening in the burner plate. In Fig. 6 the bracket $b^2$, the door $b^4$ and the boss F are omitted.

A modified form of jet casing is shown in Figs. 8 and 9, in which the ports $d^{19}$ instead of opening into ports $d^{20}$ as shown in Fig. 4, open into longitudinal passage ways $d^6$ formed on the outside of the casing part $d^{17}$. A whirling motion may also be imparted to the main air supply entering at the end of the casing by fitting a series of inclined vanes G carried by two rings $g^1$ and $g^2$ and fitting in the end of the part $d^1$, as shown in Figs. 8 and 9.

In the modification shown in Fig. 10 the movable part $d^{21}$ of the jet casing is outside the fixed part $d^{22}$; $d^{23}$ and $d^{24}$ are the ports; this view also shows a slight modification in the tamp securing means when there is no abutting shoulder such as at $e^1$ in Fig. 3, in which case two screw threaded plates $e^5$ and $e^6$, are provided one to fit on each side of the burner plate.

It will be seen in the arrangement described that upon the failure of any burner, its jet casing opening can be at once plugged up from the stoke-hold while the boiler is under steam; or, if coal alone is to be used for firing for any considerable time, all the jet casing openings can be closed up from the stoke-hold while the boiler is under steam the jet casings being thus protected against the destructive action of the coal fire; and that the renewable part of the casing can be renewed from the stoke-hold while under steam.

The length of the part $d^1$ and the ports $d^3$ and $d^4$ can be so arranged that when $d^1$ is drawn back by the distance $x$, the jet casing opening into the furnace is completely closed.

Referring now to Figs. 11 and 12, M is the cylindrical furnace, and N a part of the shell of a cylindrical boiler; the air casing C is now cylindrical, and is formed by the plates $c^1$ and a plate $a^4$ arranged across the furnace front and protected by refractory material $a^7$; the casing C is fitted with non-return louvers $e^3$; the jet casing D opening into the furnace and consisting of a movable inner casing $d^1$ and a fixed outer casing $d^2$, provided respectively with ports $d^3$ and $d^4$, and arranged substantially as previously described. The burner B is, as before, carried on the burner plate $b^1$, which latter covers an opening sufficiently large to permit the withdrawal of $d^1$. The plate $b^1$ has an opening $b^3$ covered by the doors $b^4$ as previously described, and the arrangements for withdrawing $d^1$ and inserting in its place a tamp, and for securing the latter, are as previously described.

Referring now to Figs. 13, 14, 15 and 16, the furnace is fitted with two quadrantal castings $P^1$ meeting on the center line $p^2 p^2$ and the bottoms of which rest on the plate T. The flanges $p^1$ of these quadrantal castings form the jet casing O, and an air casing D is formed by plates $d^1$, the latter being provided with non-return louvers R, through which air is admitted to the air casing. The louvers R are pivoted at $r^1$, the pivots being displaced relatively to the center of pressure so that an excess pressure in the air casing automatically closes the louvers.

The burner B is supported on a burner plate $b^1$. The fire hole door S operated by the handle $s^1$ is carried in a frame $s^2$ and the jet casing O is arranged so that the burner and air casing can be cut off from the furnace by two shutters $o^1$ which are provided with racks $o^2$ operated by pinions $o^3$ by means of spindles $o^4$. When the fire hole door S is closed and the shutters $o^1$ opened, liquid fuel can be supplied to the furnace through the burner B. If, however, the shutters $o^1$ are closed the furnace can be supplied with coal through the door S and opening Q. It will further be seen that the arrangement of the jet casings within the main air casing and the non-return air inlets on the main casing are such as to prevent any steam and hot gases from gaining access to the stoke-hold to the injury of the stokers.

It is to be understood that the details of the apparatus, such as the mode of regulating the jet casings, and the shape of the latter, can be modified within the scope of the invention; for instance, whereas in Fig. 4 the air passes from the ports $d^3$ to the ports $d^4$, and in Fig. 8 from the ports $d^{10}$ to the passage-ways $d^6$, an arrangement combining both these features may be obtained by casting a series of longitudinal ribs on the fixed part $d^2$ so as to allow a current of air to flow between $d^1$ and $d^2$ as well as to pass through $d^3$ and $d^4$. In this case the portion $a^7$ would be shaped as shown in Fig. 8 to allow for the longitudinal passage of the air between the two casings. This modification is shown in the fragmentary views Figs. 4$^A$ and 4$^B$, in which $d^{11}$ and $d^{12}$ are the inner and outer parts respectively of the jet casing, $d^{13}$ and $d^{14}$ are ports, and $d^7$ are the longitudinal ribs. When the two parts are cold there is ample clearance between the periphery of $d^{11}$ and the internal diameter of the ribs to allow for expansion when the parts become heated.

The invention is also applicable to cases where the air is supplied to the casing directly through a duct such as K, shown in dotted lines Figs. 1 and 2 from a fan, with an open stoke-hold. Any suitable form of burner may be used.

Having now fully described my invention, I declare that what I claim and desire to secure by Letters Patent is:—

1. In an air controlling device for furnaces the combination with a furnace front having an opening, of an air casing arranged across the front thereof, a burner, a jet casing located in the air casing in line with the burner and surrounding the furnace opening, said casing consisting of two parts, one fixed to the furnace front and being provided with through ports and the other part axially and angularly movable relatively thereto and adapted to control the air supply; substantially as described.

2. In an air controlling device for furnaces, the combination with a furnace front having an opening, of an air casing arranged across the front thereof, a burner, a jet casing located in the said air casing in line with the burner and surrounding the furnace opening, said casing consisting of two parts, one being a cylindrical part fixed to the furnace front and being provided with through ports, and the other having a cylindrical portion and through ports, and being axially and angularly movable relative to the fixed part and adapted to control the air supply entering through the said ports, substantially as described.

3. A furnace comprising in combination a furnace front having an opening, an air casing arranged across the front thereof, a jet casing located in the air casing and surrounding the furnace opening, said casing including a part fixed to the furnace front, an opening in the air casing front, a tamp adapted to be introduced through the opening in the air casing front and to block the furnace opening, and a detachable plate adapted to close the opening in the air casing front and alternatively to carry a burner or to hold the said tamp in position, substantially as described.

4. In an air controlling device for furnaces the combination with a furnace front having an opening, of an air casing arranged across the front thereof, a burner, a jet casing located in the air casing in line with the burner and surrounding the furnace opening, said casing consisting of two parts, one part being fixed to the furnace front and the other part being movable axially and angularly relatively thereto, air ports in the fixed part and air ports in the movable part and means operable exteriorly of the air casing for imparting such angular and axial movement to the said moving part; substantially as described.

5. In an air controlling device for furnaces the combination with a furnace front, having an opening, of an air casing arranged across the front thereof, a burner, a jet casing located in the air casing in line with the burner, and surrounding the furnace opening, said casing consisting of two parts, one part being fixed to the furnace front and the other part being movable axially and angularly relatively thereto, tangentially arranged air ports in the fixed part and tangentially arranged air ports in the movable part and means operable exteriorly of the air casing for imparting such angular and axial movement to the said moving part; substantially as described.

6. In an air controlling device for furnaces the combination with a furnace front having an opening, of an air casing arranged across the front thereof, a burner, a jet casing located in the air casing in line with the burner and surrounding the furnace opening, said casing consisting of two parts, one fixed to the furnace front and being provided with through ports, and the other part axially and angularly movable relatively thereto, and adapted to control the air supply, and a series of non-return air valves through which the air passes from the stokehold to the said air casing; substantially as described.

7. A furnace comprising in combination a furnace front having an opening, an air casing arranged across the front thereof, a jet casing located in the air casing and surrounding the furnace opening, said casing including a part fixed to the furnace front, an opening in the air casing front, a tamp adapted to be inserted through the said opening in the air casing front and adapted to block the furnace opening, and a plate adapted to cover the opening in the furnace front, said plate being provided with a central aperture through which a burner protrudes when liquid fuel is being used, and through which a screwed stem attached to the tamp passes when the latter is in position, and a flanged nut adapted to cover the said aperture when the burner is removed and to hold the said tamp in position, substantially as described.

8. In an air controlling device for furnaces the combination with a furnace front having an opening, of an air casing arranged across the front thereof, a burner, a jet casing located in the air casing in line with the burner and surrounding the furnace opening, said casing consisting of two parts, one part of which is adjustable, means for adjusting the said part consisting of a screw threaded flange attached to the air casing front and adapted to be moved angularly thereon about the center of the jet casing and a threaded bolt with which said flange engages; substantially as described.

In testimony whereof, I affix my signature in presence of two witnesses.

JOHN JONATHAN KERMODE.

Witnesses:
A. S. ALLEN,
JOSEPH E. HIRSH.